United States Patent [19]

Florent et al.

[11] 3,989,820
[45] Nov. 2, 1976

[54] ANTICOCCIDIAL SUBSTANCE AND ITS PREPARATION

[75] Inventors: Jean Florent; Jean Lunel, both of Paris; Denise Mancy, Charenton (Val-de-Marne), all of France

[73] Assignee: Rhone-Poulenc Industries, Paris, France

[22] Filed: Feb. 28, 1975

[21] Appl. No.: 554,021

[30] Foreign Application Priority Data
Mar. 1, 1974 France .......................................... 07066

[52] U.S. Cl. .................................. 424/122; 195/80 R
[51] Int. Cl.² ............................................. A61K 35/74
[58] Field of Search ...................... 195/80 R; 424/122

[56] References Cited
UNITED STATES PATENTS 3,853,991  12/1974  Cotta et al .............................. 424/122

*Primary Examiner*—Jerome D. Goldberg
*Attorney, Agent, or Firm*—Stevens, Davis, Miller & Mosher

[57] ABSTRACT

The novel antibiotic 30,504 RP which has useful anticoccidial and other chemotherapeutic properties is made by culture of the novel microorganism *Streptomyces gallinarius* DS 25881 NRRL 5785.

6 Claims, 1 Drawing Figure

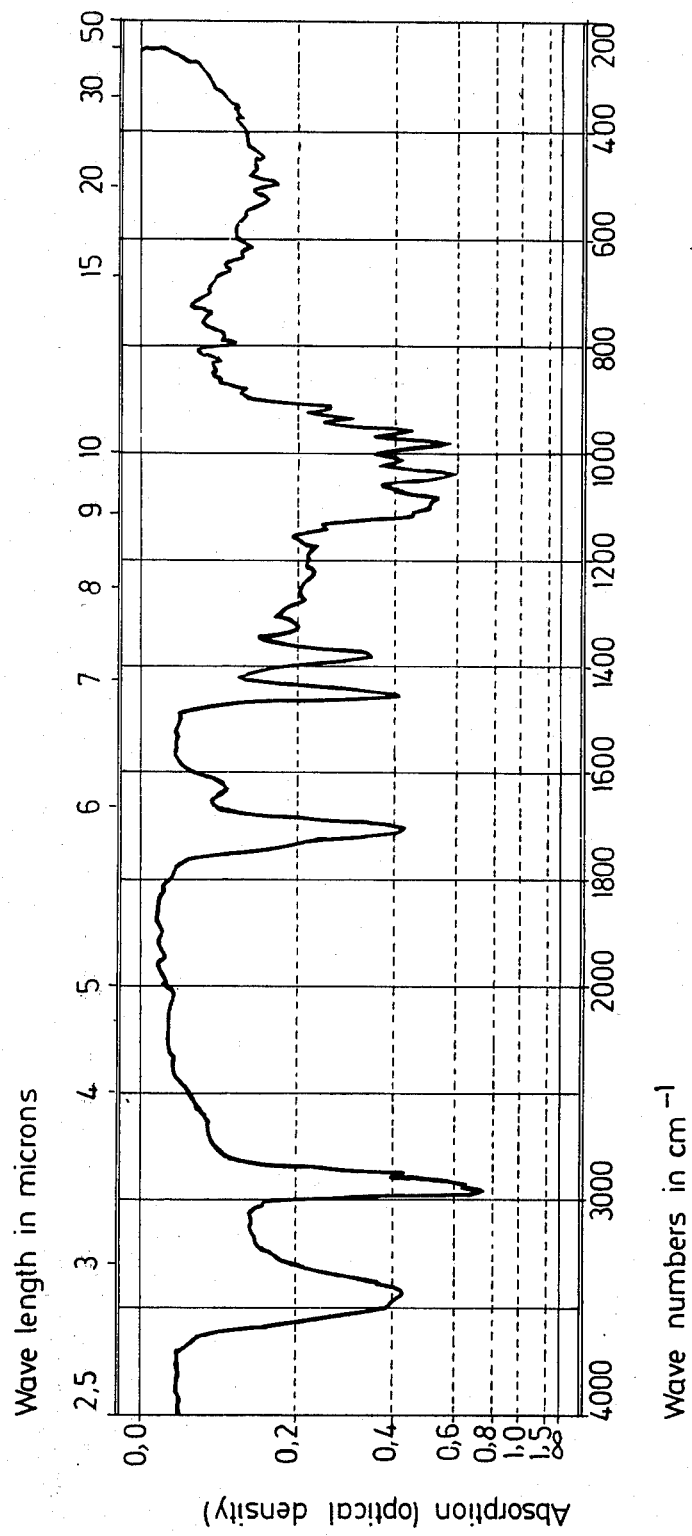

ANTICOCCIDIAL SUBSTANCE AND ITS PREPARATION

The present invention relates to antibiotic substances, their preparation, and compositions containing them.

The present invention provides the new antibiotic 30,504 RP and its salts with metals and nitrogen-containing bases. It has valuable anticoccidial activity, antibacterial activity, and growth-promoting activity.

30,504 RP can be obtained by culturing a new microorgansim more completely identified below, belonging to the *Streptomyces* genus and called *Streptomyces gallinarius* DS 25,881 (NRRL 5,785).

30,504 RP has the following physico-chemical properties:

Appearance: white micro-crystalline powder

Solubility: 30,504 RP is readily soluble in chlorinated solvents such as methylene chloride and chloroform, in alcohols such as methanol, and in dimethylformamide; it is moderately soluble in acetone and ethyl acetate, sparingly soluble in hexane and practically insoluble in water (using the notation of the Pharmacopée Francaise, IXth Edition, 2nd part, page 13 (1972)).

Percentage composition: 30,504 RP contains carbon, hydrogen and oxygen. Its percentage composition is approximately: C% = 69.4; H% = 9.0; O% = 21.0.

Neutral equivalent weight: 30,504 RP is an acid, having a neutral equivalent weight (measured in solution in dimethylformamide by titration with tetrabutyl-ammonium hydroxide) of 830.

Melting point: (measured on a Kofler bench): approximately 200° C.

Optical rotation: The specific optical rotation determined using a 1% strength solution in methanol of 30,504 RP is approximately:

$[\alpha]_D^{20} = -79°; [\alpha]_{436}^{20} = -188°; [\alpha]_{365}^{20} = -378°$.

Ultra-violet spectrum: 30,504 RP does not show any characteristic absorption in the ultra-violet.

Infra-red spectrum: (determined on tablets of a mixture with potassium bromide). This spectrum is represented in the accompanying drawing in which the wavelengths in microns (upper scale) or in wave numbers in cm$^{-1}$ (lower scale) have been plotted as the abscissae and the optical densities have been plotted as the ordinates. The main infra-red absorption bands for 30,504 RP, expressed in wave numbers (cm$^{-1}$), are given in Table I below.

TABLE I

| | | |
|---|---|---|
| 3,440 S | 1,325 m | 915 m |
| 3,030 sh | 1,315 sh | 880 w |
| 2,960 S | 1,295 sh | 865 vw |
| 2,938 S | 1,272 m | 845 vw |
| 2,880 S | 1,225 w | 825 w |
| 2,855 sh | 1,200 vw | 792 m |
| 2,640 vw | 1,172 m | 775 w |
| 2,060 vw | 1,140 m | 735 w |
| 1,945 vw | 1,115 sh | 700 w |
| 1,900 vw | 1,100 sh | 675 sh |
| 1,785 sh | 1,085 S | 655 w |
| 1,705 S | 1,070 sh | 630 sh |
| 1,632 m | 1,045 sh | 615 m |
| 1,622 sh | 1,038 S | 565 sh |
| 1,535 vw | 1,012 m | 525 m |
| 1,458 S | 980 S | 495 m |
| 1,405 sh | 958 S | 465 vw |
| 1,380 S | 935 m | 445 w | vS = very strong; S = strong; m = medium; w = weak; vw = very weak; sh = shoulder.

Chromatographic behaviour: 30,504 RP can be characterised by ascending chromatography on a thin layer of silica gel, using two solvent mixtures:

Ethyl acetate/cyclohexane/water/butanol (50/50/25/5 by volume): Rf = 0.45.

Methylene chloride/methanol (94/6 by volume): Rf = 0.55.

Bacteriostatic activity in vitro: 30,504 RP shows bacteriostatic activity especially against certain Gram-positive bacteria.

The bacteriostatic activity of 30,504 RP against a certain number of micro-organisms was determined by one of the dilution methods usually employed for this purpose. For each micro-organism, the lowest concentration of active substance which, under defined conditions, prevents its visible development in a suitable nutrient broth was determined. The results of the various determinations are given in Table II below where the minimum bacteriostatic concentrations are expressed in micrograms of substance per cc. of test medium:

TABLE II

| Bacterial organism tested | Minimum bacteriostatic concentrations (in µg./cc.) |
|---|---|
| Straphylococcus aureus, strain 209 P—ATCC 6538 P | 0.2 |
| Straphylococcus aureus, Smith strain | 0.5 |
| Sarcina lutea—ATCC 9341 | 0.9 |
| Streptococcus faecalis—ATCC 8043 | 0.1 |
| Streptococcus pyogenes haemolyticus, Dig strain (Institut Pasteur) | 0.2 |
| Diplococcus pneumoniae, Til strain (Institut Pasteur) | 0.05 |
| Neisseria catarrhalis (A 152, Institut Pasteur) | 6 |
| Bacillus subtilis—ATCC 6633 | 0.2 |
| Bacillus cereus—ATCC 6630 | 0.1 |
| Mycobacterium species—ATCC 607 | 6 |
| Escherichia coli—ATCC 9637 | > 150 |
| Shigella dysenteriae, Shiga L (Institut Pasteur) | > 150 |
| Salmonella paratyphi A (Lacasse strain, Institut Pasteur) | > 150 |
| Salmonella schottmuelleri (paratyphi B)—(Fougenc strain, Institut Pasteur) | > 150 |
| Proteus vulgaris | > 150 |
| Pseudomonas aeruginosa | > 150 |

Toxicity: In chicks, the 50% lethal dose (LD$_{50}$) is 85 mg./kg. given orally as a single dose.

Anticoccidial activity: The anticoccidial activity of 30,504 RP was determined in chicks infested with *Eimeria tenella* or *Eimeria acervulina*. Substantial anticoccidial activity is shown when 30,504 RP is incorporated into the feedstuff for the chicks at non-toxic concentrations between 0.005% and 0.04% by weight in the feedstuff.

The organism which produces 30,504 RP is a *Streptomyces* isolated from a sample of earth taken in India, which has been given the number DS 25,881. A sample of this organism has been deposited at the Northern Regional Research Laboratory of the U.S. Department of Agriculture at Peoria, Illinois (United States of America) where it has been recorded under the reference NRRL 5785.

This organism, which possesses properties such that it cannot be identified with any species already described, is considered to be a new species, and it has been given the name *Streptomyces gallinarius*, DS 25,881.

It was isolated by the general method which consists of suspending a small amount of earth in sterile distilled water, of diluting the suspension to different concentrations, and of spreading a small volume of each dilution on the surface of Petri dishes containing a nutrient agar medium. After incubation for a few days at 26° C., which allows the micro-organisms to develop, the colonies which it is desired to isolate in order to investigate them further are removed and transplanted on nutrient agars in order to produce more abundant cultures thereof.

*Streptomyces gallinarius* DS 25,881 forms cylindrical to oval spores measuring 1.0 to 1.2μ/0.8 to 1.0μ; its sporophores are in clusters; the sporiferous filaments, which are loose and flexuous, frequently coil over at their end, either assuming a slightly curved shape, or forming a spiral turn or occasionally several turns. By its method of sporulation, this strain is classified in the Retinaculum-Apertum Section of the Pridham classification.

*Streptomyces gallinarius* DS 25,881 develops well at 26° C. and at 37° C., but not at 50° C. It possesses a sporulated aerial mycelium which is coloured grey. The coloration of its vegetative mycelium generally ranges, depending on the culture medium, from yellow or greyish-yellow to brown-yellow or yellow-brown. Except for a particular soluble brownish pink-violet pigment on Hickey-and-Tresner agar, it gives, on all the culture media on which it has been observed, a soluble pigment which is generally not very intense and ranges from brownish-yellow or brownish-grey to yellow-brown.

In cultures carried out at 26° C., it possesses the following biochemical properties:

| | |
|---|---|
| Production of melanin | Negative |
| Production of H$_2$S | Positive |
| Tyrosinase | Positive |
| Liquefaction of gelatine | Highly positive, both on nitrated nutrient broth and on synthetic media. |
| Utilisation of cellulose | |
| Production of nitrites from nitrates | |
| Hydrolysis of starch | Positive |
| Culture on skimmed milk | Peptonisation without coagulation; very slight acidification of the pH. |
| Negative | |
| Negative | |

The culture characteristics of *Streptomyces gallinarius* DS 25,881 are given in the table below. They are those of cultures which have reached a good stage of development, that is to say approximately 2 to 3 weeks at 26° C. unless otherwise indicated. These characteristics were observed on nutrient agars and broths usually employed to determine the morphological characteristics of *Streptomyces*, the cultures on agar media being carried out on sloping agars. Some of the culture media employed were prepared in accordance with the formulations indicated in "The Actinomycetes", S. A. WAKSMAN, page 193-197, Chronica Botanica Company, Waltham, Mass., U.S.A., 1950; in this case, they are indicated by the letter W followed by the number which was given to them in "The Actinomycetes". The references or compositions of the other media are as follows:

Ref. A—"Hickey and Tresner's Agar"—T. G. PRIDHAM and colleagues—Antibiotics Annual, 1956-1957, page 950.

Ref. B—"Bennett's Agar"—S. A. WAKSMAN—The Actinomycetes, volume 2, page 331—No. 30—The Williams and Wilkins Company, Baltimore, 1961.

Ref. C—Formulation W-23, to which 2% of agar have been added.

Ref. D—"Yeast Extract Agar." T. G. PRIDHAM and colleagues—Antibiotics Annual, 1956-1957, page 950.

Ref. E—"Tomato Paste Oatmeal Agar"—T. G. PRIDHAM and colleagues—Antibiotics Annual, 1956-1957, page 950.

Ref. F—"Melanin formation medium"—S. A. WAKSMAN—The Actinomycetes, volume 2, page 333, No. 42—The Williams and Wilkins Company, Baltimore, 1961.

Ref. G—W. E. GRUNDY and colleagues—Antibiotics and Chem., 2, 401, 1952.

Ref. H—"Inorganic Salts—Starch Agar"—T. G. PRIDHAM and colleagues—Antibiotics Annual, 1956-1957, page 951.

Ref. I—Corresponds to the formulation W-1, wherein 3% of sucrose are replaced by 1.5% of glucose.

Ref. J—Corresponds to the formulation W-1, wherein 3% of sucrose are replaced by 1.5% of glycerol.

Ref. K—Corresponds to the formulation W-18, wherein 3% of sucrose are replaced by 1.5% of glucose.

Ref. L—Corresponds to the formulation W-18, wherein the sucrose is removed and is replaced by small strips of filter paper partially immersed in the liquid.

Ref. M—"Manual of Methods for Pure Culture Study of Bacteria"—Society of American Bacteriologists—Geneva, N.Y. II$_{50}$-18.

Ref. N—"Plain gelatin"—prepared in accordance with the instructions of the "Manual of Methods for Pure Culture Study of Bacteria"—Society of American Bacteriologists—Geneva, N.Y. II$_{50}$-18.

Ref. P—Commercially available skimmed milk powder—reconstituted in accordance with the manufacturer's instructions.

Ref. Q—Medium indicated for investigating the production of H$_2$S, by: H. D. TRESNER and F. DANGA—Journal of Bacteriology, 76, 239-244, 1958.

| Culture medium | Degree of development | Vegetative mycelium (V.m.) or Underside of the culture | Aerial apparatus (comprising the combination of the aerial mycelium and the sporulation) | Soluble pigment | Observations and biochemical properties |
|---|---|---|---|---|---|
| Hickey and Tresner's agar (Ref. A). | Good | Underside light yellow-brown to violet-brown. | Light grey to dark grey. Well developed. | Brownish pink-violet. | Cylindrical to oval spores measuring 1.0 to 1.2μ/0.8 to 1.0μ. Sporophores in clusters—loose and flexuous sporiferous filaments frequently having a curved ending or forming one spiral turn or occasionally several turns. |

Continued

| Culture medium | Degree of development | Vegetative mycelium (V.m.) or Underside of the culture | Aerial apparatus (comprising the combination of the aerial mycelium and the sporulation) | Soluble pigment | Observations and biochemical properties |
|---|---|---|---|---|---|
| Bennett's agar (Ref. B). | Fairly good | V.m. yellow | Whitish to greyish. Very poorly developed. | Brownish yellow | |
| Emerson's agar (Ref. C.) | Good | V.m. brownish yellow. | Whitish. Very poorly developed. | Weak yellow-brown. Weak brownish. | |
| Pridham's yeast extract agar (Ref. D). | Fairly good | Underside brown-yellow. | Whitish to greyish. Very moderately developed. | Weak brownish | |
| Pridham's oatmeal and tomato paste agar (Ref. E). | Fairly good | Vm. brownish Yellow. | Whitish to greyish. Very moderately developed. | None or weak brownish. | |
| Glucose-peptone agar (W-6) | Fairly good | V.m. yellow | Whitish. Very poorly developed. | Very weak brownish yellow. | |
| Nutrient agar (W-5). | Moderate | V.m. yellow-brown. | None. (Whitish, in trace amounts). | None | |
| Tyrosine-yeast extract agar for the formation of melanin (Ref. F). | Very moderate | V.m. yellow-brown. | Whitish. In trace amounts. | Weak yellow-brown. | Production of melanin: negative (readings made according to the author's instructions). |
| Krainsky's calcium malate agar (Ref. G). | Poor | V.m. weak brownish yellow. | None | None | Solubilisation of the malate slight and slow. |
| Ovalbumin agar (W-12) | Very poor | V. m. weak brownish yellow. | None | None | |
| Glucose-asparagine agar (W-2). | Moderate | V.m. light yellow | Whitish. Very poorly developed. | None | |
| Glycerol-asparagine agar (W-3). | Fairly good | V.m. yellow | Greyish-white to dark grey. Very moderately developed. | Weak yellowish brown. | |
| Pridham's starch-inorganic salts agar (Ref. H). | Moderate | Underside yellow-brown. | Whitish to light grey and dark grey. Moderately developed. | Weak brown-grey | Hydrolysis of starch: positive. Cylindrical to oval spores measuring 1.0 to 1.2$\mu$/0.8 to 1.0$\mu$. Sporophores in clusters. Loose and flexuous sporiferous filaments frequently having a curved ending or forming one spiral turn or occasionally several turns. |
| Starch-nitrate agar (W-10) | Very moderate | V.m. light brownish yellow. | Greyish white. Very poorly developed. | Weak yellow-brown. | Hydrolysis of starch: positive. |
| Czapek's synthetic agar containing sucrose (W-1). | poor | V.m. weak greyish yellow. | None | None, or weak yellowish. | |
| Czapek's synthetic agar containing glucose (Ref. I). | Poor | V.m. weak greyish yellow. | None | None or very weak yellowish. | |
| Czapek's synthetic agar containing glycerol (Ref. J). | Very moderate | V.m. weak brownish yellow. | Whitish. In trace amounts. | Weak brownish yellow. | |
| Starch-nitrate broth (W-19). | Moderate | Greyish to brownish web. | Whitish. Very moderately developed. | None | Production of nitrates: highly positive. |
| Czapek's synthetic broth containing sucrose (W-18). | Very poor | Greyish white flocculent culture. | None | None | Production of nitrates: highly positive. |
| Czapek's synthetic broth containing glucose (Ref. K). | Very poor | Greyish white flocculent culture. | None | None | Production of nitrates: highly positive. |
| Czapek's synthetic broth containing cellulose (Ref. L). | Very poor | Greyish white flocculent culture. | Greyish. Very poorly developed on the paper emerging from the broth. | None | Production of nitrates: highly positive. Utilization of cellulose: positive. |
| Nitrated nutrient broth (Ref. M). | Moderate | Yellowish brown ring. | None | None | Production of nitrates: highly positive. |
| 12% pure gelatine (Ref. N). | Good | V.m. yellow-brown. | Whitish. In trace amounts. | None | Liquefaction positive and moderate. |
| Culture on potato (W-27). | Good | V.m. light yellow-brown. | Greyish white. In trace amounts. | Weak brownish | |
| Skimmed milk (Ref. P) | Good | Light brownish yellow ring. | None | | Peptonisation without coagulation. Slight acidification of the pH which changes from 6.2 to 5.8 over the course of 1 month. |
| Tresner and Danga's agar (Ref. Q). | Moderate | V.m. yellow-brown. | None | None | Production of H$_2$S: negative (readings made in accordance with the author's instructions). |

*Streptomyces gallinarius* DS 25,881 possesses properties which do not coincide exactly with those of any of the species already described; consequently it is considered to be a new species.

Of the species described in "The Actinomycetes" (volume 2, S. A. WAKSMAN, The Williams and Wilkins Company, Baltimore, 1961) and in "Bergey's Manual of Determinative Bacteriology" (7th edition, The Williams and Wilkins Company, Baltimore, 1957), the species with which *Streptomyces gallinarious* DS 25,881 can be most logically be compared is *Streptomyces hygroscopicus*. In fact, like *Streptomyces hygroscopicus*, *S. gallinarius* DS 25,881 develops a vegetative mycelium which is generally yellow or greyish-yellow to brown-yellow or yellow-brown and possesses a grey sporulated aerial mycelium; it does not form any melanin-type soluble pigment on organic media, does not produce $H_2S$ and slowly liquefies gelatine on which it does not form any soluble pigment; on all its culture media, both synthetic and organic, it either does not give any soluble pigment or gives only soluble pigments which are generally not very intense, ranging from brownish-yellow to brownish-grey to yellow-brown. In addition to these characteristics, *S. gallinarius* DS 25,881 possesses the property of producing, in a particular manner, on one of the media on which it has been cultured (namely Hickey and Tresner's agar), a soluble brownish pink-violet pigment, and this is a characteristic acknowledged by H. D. TRESNER and E.

brownish vegetative mycelium, and possesses a grey sporulated aerial mycelium; moreover, *S. aureofaciens* does not give any soluble pigment on numerous culture media and, when it does do so, gives soluble pigments of a yellow to brownish coloration in a manner which is generally rather weak. In some cases, the vegetative mycelium of *S. aureofaciens* is coloured red-brown to purple, but in this case, what is involved is a pigment which does not diffuse in the medium and which consequently cannot correspond to the soluble brownish pink-violet pigment which *S. gallinarius* DS 25,881 can produce. Moreover, *S. aureofacines* does not liquefy gelatine, on which it forms a cream-coloured vegetative mycelium, and neither coagulates nor peptonises skimmed milk, whilst *S. gallinarius* DS 25,881 liquefies gelateine, on which it forms a yellow-brown vegetative mycelium, and gives marked and uniform peptonisation of skimmed milk. It is thus seen that *S. gallinarius* DS 25,881 also differs from *S. aureofaciens*.

The ability of *S. gallinarius* DS 25,881 to utilise various sources of carbon or nitrogen for its development was determined in accordance with the Pridham and Gottlieb method (J. of Bact., 56, 107–114m 1948); the degree of development was observed on the base medium indicated by the authors, replacing either the glucose by one of the various sources of carbon tested, or the $(NH_4)_2SO_4$ by one of the various sources of nitrogen tested.

The result are given in the following table:

| Source of carbon tested | Utilisation | Source of nitrogen tested | Utilisation |
|---|---|---|---|
| D-Ribose | Negative | $NaNO_3$ | Positive |
| D-Xylose | Positive | $NaNO_2$ | Positive |
| L-Arabinose | Positive | $(NH_4)_2SO_4$ | Positive |
| L-Rhamnose | Positive | $(NH_4)_2HPO_4$ | Positive |
| D-Glucose | Positive | Urea | Positive |
| D-Galactose | Positive | L-Asparagine | Positive |
| D-Fructose | Positive | Glucosamine | Positive |
| D-Mannose | Positive | Glycine | Positive |
| L-Sorbose | Negative | Sarcosine | Negative |
| Lactose | Positive | DL-Alanine | Positive |
| Maltose | Positive | DL-Valine | Positive |
| Sucrose | Positive | DL-Aspartic acid | Positive |
| Trehalose | Positive | L-Glutamic acid | Positive |
| Cellobiose | Positive | L-Arginine | Positive |
| Raffinose | Negative | L-Lysine | Positive |
| Dextrin | Positive | DL-Serine | Positive |
| Inuline | Negative | DL-Threonine | Positive |
| Starch | Positive | DL-Methionine | Positive |
| Glycogen | Positive | Taurine | Negative |
| Glycerol | Positive | DL-Phenylalanine | Positive |
| Erythritol | Negative | L-Tyrosine | Positive |
| Adonitol | Negative | DL-Proline | Positive |
| Dulcitol | Negative | L-Hydroxyproline | Positive |
| D-Mannitol | Positive | L-Tryptophan | Positive |
| D-Sorbitol | Negative | Betaine | Negative |
| Inositol | Positive | | |
| Salicin | Positive | | |

J. BACKUS—(Applied Microbiology 4, 243–250, 1956) to be possessed by numerous strains of the species *S. hygroscopicus* and observed on media which vary depending on the strain. However, the new micro-organism differs from this species in 2 of the 3 essential characteristics by which it is defined: first, in the shape of its sporophores, which does not correspond to that of the sporophores of *S. hygroscopicus*; and secondly, by the fact that in no case does it form in its sporulated aerial mycelium the shiny black zones characteristic of *S. hygroscopicus*.

*S. gallinarius* DS 25,881 can also be compared with *Streptomyces aureofaciens* which also does not produce malanin, generally forms a yellow to orange-yellow or According to the invention 30,504 RP is prepared by culturing *Streptomyces gallinarius* DS 25,881, or a productive mutant thereof (i.e. a mutant capable of producing 30,504 RP), aerobically in a culture medium, and isolating the 30,504RP formed during the culture, as such or as a salt.

The culture of *Streptomyces gallinarius* DS 25,881 can be carried out by any method of aerobic surface culture or submerged culture, but the latter is to be preferred for reasons of convenience. For this purpose, the various types of apparatus usually employed in the fermentation industry may be used.

In particular, the following sequence can be adopted for carrying out the culture:

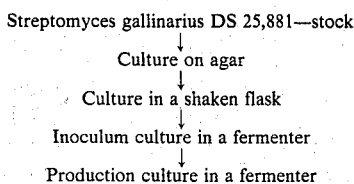

The fermentation medium must essentially contain a source of assimilable carbon and a source of assimilable nitrogen, mineral elements, in particular chlorides, and optionally growth factors, and these materials may be introduced as well-defined products or as complex mixtures such as are encountered in biological products of various origins.

Suitable sources of assimilable carbon include carbohydrates such as glucose, sucrose, maltrose, dextrins, starch and other carbohydrate substances such as sugar alcohols (including glycerol) and certain organic acids such as lactic acid and citric acid. Certain animal or vegetable oils such as lard oil or soya oil may replace these various carbohydrate sources or can be added to them.

Suitable sources of assimilable nitrogen are extremely diverse. They can be very simple chemical substances such as inorganic or organic ammonium salts, urea and certain aminoacids. Nitrogen can also be introduced in complex substances, mainly containing nitrogen in a protein form, such as casein, lactalbumin, gluten and their hydrolysis products, soya flour, groundnut flour, fishmeal, meat extract, yeast extract, distillers' solubles and corn-steep.

Among the mineral elements added, some can have a buffering or neutralising effect such as alkali metal or alkaline earth metal phosphates or calcium or magnesium carbonates. Others provide the ionic equilibrium necessary for the development of *Streptomyces gallinarius* DS 25,881 and for the formation of 30,504 RP, such as alkali metal and alkaline earth metal chlorides and sulphates. Finally, some act more especially as activators of the metabolic reactions of *Streptomyces gallinarius* DS 25,881; these are zinc, cobalt, iron, copper and manganese salts.

Suitable growth factors are vitamin-type natural products such as riboflavin, folic acid and pantothenic acid.

The pH of the fermentation medium at the start of the culture should be between 5.8 and 7.8, and preferably between 6.2 and 7.4 The optimum temperature for the fermentation process is between 25 and 30° C., but satisfactory production is achieved at temperatures of between 23 and 33° C. The aeration of the fermentation can vary between rather wide values. It has, however, been found that a rate of aeration of 0.3 to 3 litres of air per litre of broth per minute is very suitable. The maximum yield of 30,504 RP is obtained after 2 to 8 days of culture, this period of time depending essentially on the medium used.

From these facts, it can be seen that the general conditions for the culture of *Streptomyces gallinarius* DS 25,881 for the production of 30,504 RP can vary to a large extent and can be adapted to particular requirements.

30,504 RP can be isolated from the products of the culture in the following way: The culture medium is filtered at an acid pH, generally between 3 and 6 and preferably close to 5, in the presence of a filtration aid. The 30,504 RP is retained in the filter cake and is extracted therefrom with a suitable organic solvent, e.g. a lower alcohol like methanol or a chlorinated solvent such as methylene chloride. The crude product can be isolated from the organic solution by crystallisation after concentration under reduced pressure, adding, where appropriate, a poor solvent or a non-solvent for the 30,504 RP, and leaving the solution for a period of time in a cold chamber to complete the crystallisation of the 30,504 RP.

30,504 RP can be purified by conventional methods such as recrystallisation, chromatography on a suitable adsorbent or counter-current distribution.

The following example illustrates the invention.

EXAMPLE 1 a. Fermentation: The following constituents are introduced into a 170 litre fermenter:

Peptone, 1,200 g.
Yeast extract, 600 g.
Glucose monohydrate, 1,200 g.
Partially hydrolysed starch, 2,400 g.
Tap water, sufficient for 110 litres.

The pH is adjusted to 7.3 by adding 10N sodium hydroxide solution (50 cc.). The medium is sterilised by bubbling steam at 122° C. through it for 40 minutes; after cooling, the volume of the broth is 120 litres because of the condensation of steam during the sterilisation process, and the pH is 6.90.

The broth is inoculated with a culture (200 cc.) of *Streptomyces gallinarius* DS 25,881, produced in an agitated Erlenmeyer flask. The culture is developed for 21 hours with agitation and aeration with sterile air; it is then suitable for inoculating the production culture.

The production culture is carried out in a 800 litre fermenter into which the following substances are introduced:

Distillers' solubles, 12.5 kg.
Sucrose, 12.5 kg.
Sodium chloride, 2.5 kg.
Magnesium sulphate heptahydrate, 1.0 kg.
Solution of cobalt chloride hexahydrate, of concentration 20 g./l., 0.5 litre.
Tap water, sufficient for 460 litres.

The pH of the medium is adjusted to 7.5 by adding 10 N sodium hydroxide solution (720 cc.), and the medium is then sterilised by bubbling steam at 122° C. through it for 40 minutes. After cooling, the volume of the broth is 500 litres because of the condensation of steam during the sterilisation process, and the pH of the medium is 6.40; it is inoculated with the inoculum culture (50 litres) from the 170 litre fermenter described above. The culture is developed for 116 hours at 27° C. while stirring with a turbine rotating at 205 revolutions/minute and while aerating with sterile air (in a volume of 20 m.³/hour). The lowering of the pH at the start of culture is limited to 6.5 by the automatic addition of 5 N sodium hydroxide solution (total amount used: 0.5 litre). At the end of the operation, the pH of the culture is 7.85 and the volume is 470 litres.

b. Extration: The medium obtained under the conditions indicated above (1,000 litres) is stirred for half an hour after being acidified to pH 5 by addition of 6 N hydrochloric acid (7 litres). After mixing with a filtration aid (35 kg.), the medium is filtered on a filter press. The filter cake is washed on the filter with water (200 litres), the pH of which is adjusted to 5 with 6 N hydrochloric acid. The filtrate and the wash liquid are removed.

The filter cake is triturated in methanol (700 litres); the mixture obtained is brought to pH 7 by adding 6 N sodium hydroxide solution (470 cc.) and stirred for half an hour. The mixture is filtered on a filter press and the filter cake is washed on the filter with methanol (100 litres).

The filtrate and the wash liquid are combined and concentrated under reduced pressure (5 to 10 mm Hg) so as to obtain an aqueous concentrate (60 litres). This concentrate is adjusted to pH 3 by adding 6 N hydrochloric acid (580 cc.) and then stirred for 10 minutes with methylene chloride (40 litres). The two phases are separated. The aqueous phase is further extracted with methylene chloride (successively 30 litres and 20 litres). The methylene chloride extracts are combined and stirred with water (9 litres), and acidified until a pH of 3 is obtained in the aqueous phase by addition of 20 cc. of 6 N hydrochloric acid. The organic phase is isolated and then washed again with water (18 litres), adding 20 cc. of 6 N sodium hydroxide solution until a pH of 9.5 is obtained in the aqueous phase. The methylene chloride phase is concentrated under reduced pressure (5 to 10 mm Hg) to a volume of approximately 1 litre.

The methylene chloride concentrate thus obtained is poured slowly into hexane (10 litres). The solution is filtered to remove inactive insoluble material (7.5 g.). The filtrate is concentrated to a volume of approximately 1 litre. The concentrate, to which ethyl acetate (1 litre) has been added, is stirred in the presence of water (1 litre). The pH is adjusted to 3 by adding 6 N hydrochloric acid.

The organic phase is isolated and concentrated to a volume of 1 litre. 30,504 RP crystallises slowly when the solution is left to stand at +4° C. The crystals obtained are filtered off and washed with hexane at 4° C. (50 cc.) and then dried at 35° C. under reduced pressure (5 to 10 mm Hg). Crude 30,504 RP in the acid form (76 g.) is thus obtained.

c. Purification: The product obtained above (76 g.) is dissolved in acetone (1,520 cc.). The solution is stirred for half an hour in the presence of active charcoal. The suspension is filtered and the filter is washed with acetone (100 cc.). The filtrate and the wash liquid are combined; water (850 cc.) is then added, while stirring slowly at 0° C., and the mixture is left to stand at 4° C. The crystals which have appeared are filtered off, washed with a mixture of acetone and water (1–3 by volume, 100 cc.), and dried under reduced pressure (5 to 10 mm Hg) at 35° C. 30,504 RP (68.5 g.) is thus obtained.

d. Recrystallisation: The product thus obtained (68 g.) is dissolved in hexane (2.88 litres). The solution is stirred for 7 hours, during which time the product recrystallises slowly. The suspension is left to stand for 15 hours at +4° C. and the crystals are then filtered off, washed with hexane (100 cc.) and dried under reduced pressure (5 to 10 mm Hg) for 12 hours at 35° C. A first fraction (54 g.) of 30,504 RP in the acid form is thus obtained.

A second fraction can be obtained by concentrating the mother liquors under reduced pressure (5 to 10 mm Hg) to a volume of 0.4 litre and by leaving this to stand for 12 hours at +4° C. The crystals which have formed are filtered off, washed with hexane (20 cc.) and dried under reduced pressure (5 to 10 mm Hg) for 12 hours at 35° C. A second fraction (10 g.) of 30,504 RP in the acid form is thus obtained.

The invention includes within its scope compositions for feeding to animals which contain 0.0001 to 99.9% by weight of 30,504 RP, or a salt thereof with a metal or a nitrogen-containing base, and a substance capable of being consumed by the animals. Such compositions may comprise a mixed feedstuff for animals or a concentrated mixture for feeding animals, 30,504 RP or a salt thereof with a metal or with a nitrogen-containing base and optionally another anticoccidial agent.

The dose necessary to produce a suitable effect can of course vary within rather wide limits depending on the proportion of the feedstuffs themselves. In general terms, it suffices for the feedstuffs provided for the animals to contain 0.005 to 0.04% by weight of 30,504 RP or its salts with metals or nitrogen-containing bases.

30,504 RP and its salts with metals or nitrogen-containing bases can be distributed in the form of a uniform dispersion throughout the complete feedstuffs, in the above proportions.

It can be distributed throughout supplementary feedstuffs, most frequently together with other additives such as vitamins and inorganic salts. These supplementary feedstuffs can be either mixed with the main ration or consumed as they are; they usually represent 5 to 20% of the main ration.

The "premixes," used to prepare the complete rations or supplementary feedstuffs, usually contain 0.05 to 20% of 30,504 RP or a salt thereof with a metal or a nitrogen-containing base, diluted in a feedstuff extender. They form a convenient intermediate which makes it easier to distribute the active product uniformly throughout the feedstuffs. The premixes themselves are generally produced from concentrates which contain 99.9 to 20% of 30,504 RP or salt thereof, to which edible denaturing agents such as edible dyestuffs, flavouring substances, dispersing agents or agents which prevent agglomeration, and feedstuff extenders have been added.

The concentrates and premixes are generally pulverulent. The supplementary feedstuffs and the complete feedstuffs can be either pulverulent or in the form of granules prepared in accordance with the usual techniques.

The following example illustrates compostions according to the invention:

EXAMPLE 2

A base feedstuff having the following composition is prepared:

|  | Percent |
| --- | --- |
| Cereal middlings flour | 13.41 |
| Barley flour | 13.41 |
| Maize flour | 13.41 |
| Wheat flour | 31.32 |
| Fishmeal | 8.92 |
| Soya flour | 8.92 |
| Dehydrated fodder flour | 4.56 |
| Yeast extract | 2.33 |
| Dry milk powder | 2.68 |
| Sodium chloride | 0.09 |
| Calcium chloride | 0/89 |
| Mineral elements | 0.06 |
| Vitamin-type complex: | |
| Vitamin A, 4,000 I.U./kg. | |
| Vitamin $D_3$, 1,000 I.U./kg. | |
| choline chloride, 11.5 mg./kg. | |
| Riboflavin, 2.24 mg./kg. | |

0.02% of 30,504 RP is added to and distributed uniformly throughout this feedstuff.

The present invention also provides compositions based on 30,504 RP or a salt thereof, which can be used as a growth factor for ruminants (cattle, sheep and goats) and as an agent for combating dysentery in pigs.

These compositions consist of mixed feedstuffs for ruminants or pigs and of concentrated mixtures for feeding animals, which contain the 30,504 RP or a salt thereof.

The dose necessary to produce a suitable effect can of course vary within wide limits depending on the species of animal and on the nutrient value of the feedstuffs themselves.

It is particularly advantageous to provide the animals with a daily amount of 30,504 RP of between 50 and 250 mg. per head of animal.

The 30,504 RP is preferably distributed throughout supplementary feedstuffs which contain 0.01 to 0.1% of the antibiotic, most frequently together with other additives such as vitamins and inorganic salts. These supplementary feedstuffs can either be mixed with the ration or consumed as they are, and usually represent approximately 1 to 10% of the daily ration; 30,504 RP thus corresponds to 0.0001–0.01% by weight of the daily ration.

The "premixes," used to prepare the complete rations or supplementary feedstuffs, generally contain 0.1 to 5% of the 30,504 RP diluted in a feedstuff extender. They form a convenient intermediate which makes it easier to distribute the antibiotic 30,504 RP uniformly throughout the feedstuffs. The "premixes" themselves are generally produced from concentrates which contain 99.9 to 5% of the 30,504 RP to which edible denaturing agents such as edible dyestuffs, flavouring substances, dispersing agents or agents which prevent agglomeration, and feedstuff extenders have been added.

The concentrates and "premixes" are generally pulverulent. The supplementary feedstuffs can be either pulverulent or in the form of granules prepared in accordance with the usual techniques. In these compositions, the antibiotic 30,504 RP or its salts can be in the form of fine particles which are free or covered with a coating.

We claim:

1. The antibacterial and anticoccidial substance hereinbefore designated 30,504 RP, or its pharmaceutically-acceptable salts, said substance having in the acid form the properties: it is a white crystalline powder readily soluble in methylene chloride, chloroform, methanol, and dimethylformamide, moderately soluble in acetone and ethyl acetate, sparingly soluble in hexane, and practically insoluble in water; its elementary composition is approximately C % = 69.4; H % = 9.0; and O % = 21.0; it is an acid substance having a neutral equivalent weight (measured in solution in dimethylformamide by titration with tetrabutyl-ammonium hydroxide) of 830; its melting point is approximately 200° C. (measured on a Kofler bench), and its optical rotation (measured at a concentration of 1% in methanol) is approximately: $[\alpha]_D^{20} = -79°$; $[\alpha]_{436}^{20} = -188°$; and $[\alpha]_{365}^{20} = -378°$; its ultra-violet spectrum does not show any characteristic absorption; and its infra-red spectrum (determined on tablets of a mixture with potassium bromide) shows the following characteristic absorption bands expressed in wave numbers: 3440 S, 3030 sh, 2960 S, 2938 S, 2880 S, 2855 sh, 2640 vw, 2060 vw, 1945 vw, 1900 vw, 1785 sh, 1705 S, 1632 m, 1622 sh, 1535 vw, 1458 S, 1405 sh, 1380 S, 1325 m, 1315 sh, 1295 sh, 1272 m, 1225 w, 1200 vw, 1172 m, 1140 m, 1115 sh, 1100 sh, 1085 S, 1070 sh, 1045 sh, 1038 S, 1012 m, 980 S, 958 S, 935 m, 915 m, 880 w, 865 vw, 845 vw, 825 w, 792 m, 775 w, 735 w, 700 w, 675 sh, 655 w, 630 sh, 615 m, 565 sh, 525 m, 495 m, 465 vw, 445 w cm.$^{-1}$; in ascending chromatography on a thin layer of silica gel using, as solvent, a mixture of ethyl acetate, cyclohexane, water and butanol (50/50/25/5 by volume) it has an Rf of 0.45, and using a mixture of methylene chloride and methanol (94/6 by volume) it has an Rf of 0.55.

2. A process for the preparation of 30,504 RP or its pharmaceutically-acceptable salts, which comprises culturing *Streptomyces gallinarius* DS 25,881 (NRRL 5,785), aerobically in a culture medium containing a source of assimilable carbon, a source of assimilable nitrogen, and mineral elements, at a temperature between 23° and 33° C. for from 2 to 8 days with a pH at the start of the culture of between 5.8 and 7.8, and isolating the 30,504 RP formed during the culture in the form of the acid, or as a pharmaceutically-acceptable salt thereof.

3. Process according to claim 2 in which the pH of the culture medium at the start of the culture is between 6.2 and 7.4.

4. Process according to claim 2 in which the temperature of the culture is between 25 and 30° C.

5. Process according to claim 2 in which the culture medium is aerated at a rate of 0.3 to 3 litres of air per litre of medium per minute.

6. Process according to claim 2 in which the 30,504 RP is isolated by filtering the culture medium at a pH of 3 to 6 and extracting the 30,504 RP from the filter cake with a methanol or methylene chloride.

* * * * *